J. M. SHERER.
BEET DIGGING MACHINE.
APPLICATION FILED OCT. 12, 1915.
1,176,104.
Patented Mar. 21, 1916.
2 SHEETS—SHEET 1.
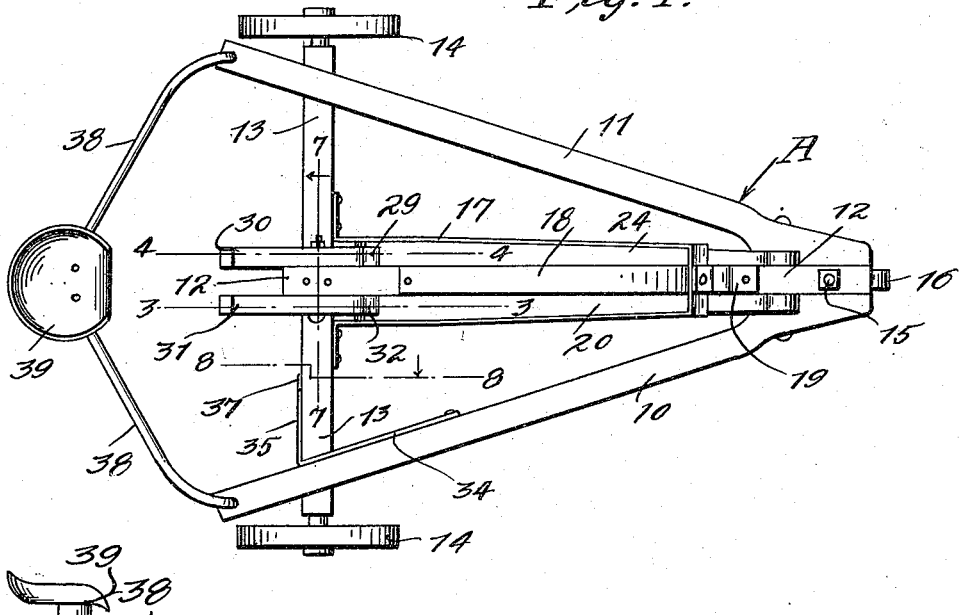
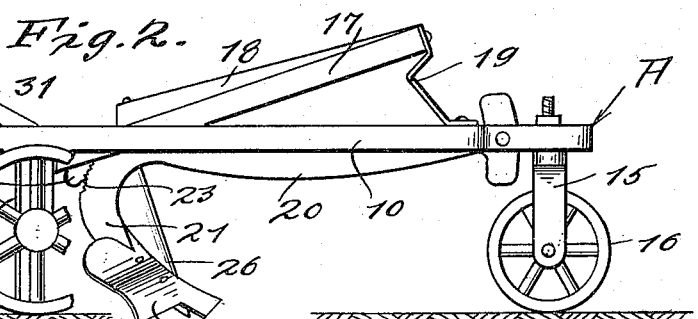
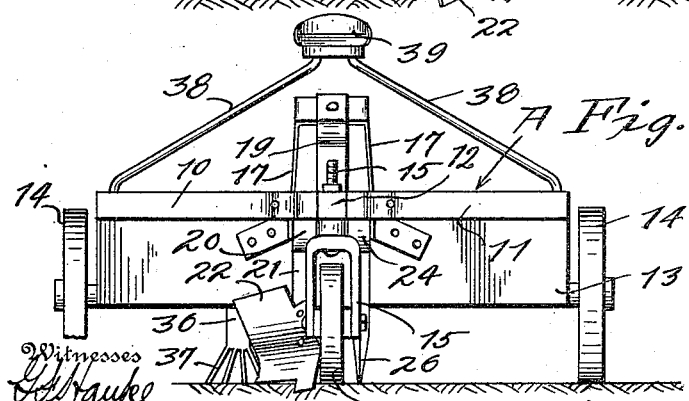
Inventor
J. M. Sherer.

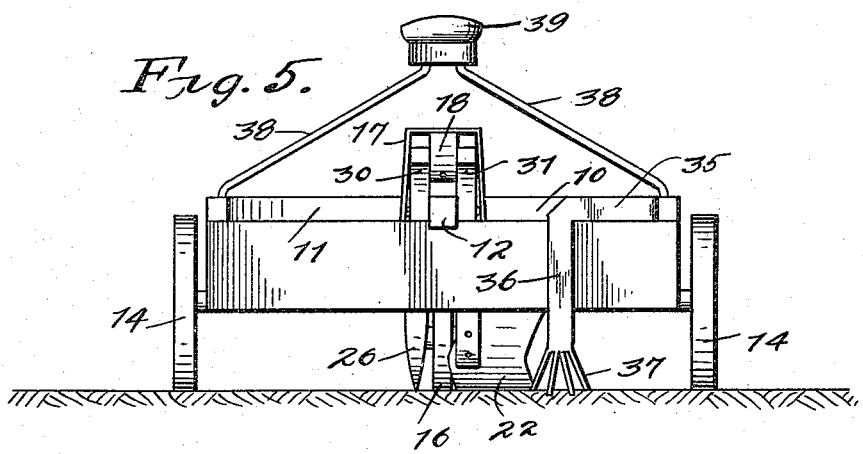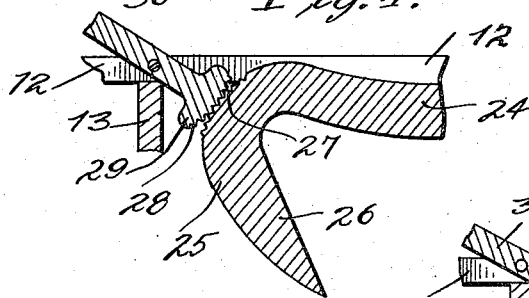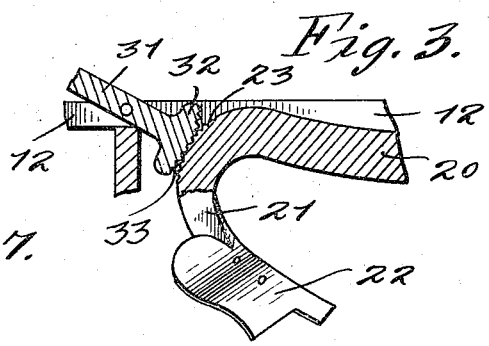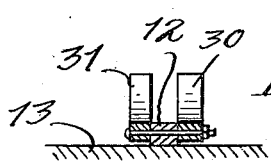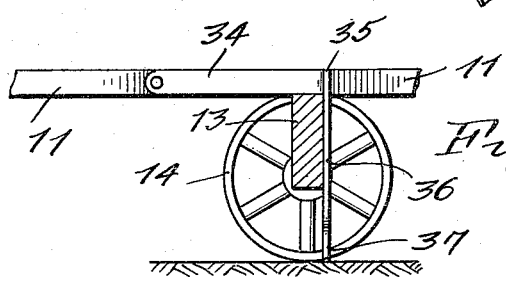

UNITED STATES PATENT OFFICE.

JOHN M. SHERER, OF AMERICA, ALABAMA.

BEET-DIGGING MACHINE.

1,176,104.  Specification of Letters Patent.  Patented Mar. 21, 1916.

Application filed October 12, 1915. Serial No. 55,458.

*To all whom it may concern:*

Be it known that I, JOHN M. SHERER, a citizen of the United States, residing at America, in the county of Walker, State of Alabama, have invented certain new and useful Improvements in Beet-Digging Machines; and I do hereby declare the following to be a full, clear, and exact description of the invention, such as will enable others skilled in the art to which it appertains to make and use the same.

This invention relates to beet digging machines.

The object of the invention is to provide a beet digging machine which will efficiently loosen the soil in which the beets are disposed and then move the beets to the top of such loosened soil where they may be easily gathered.

A further object of the invention is to provide a beet digging machine which will be simple in construction and in which the various parts may be easily adjusted by the foot of the operator to meet the particular conditions at hand.

With the above and other objects in view the invention consists in the details of construction and in the arrangement and combination of parts to be hereinafter more fully described and particularly pointed out in the appended claims.

In describing the invention in detail reference will be had to the accompanying drawings wherein like characters of reference denote corresponding parts in the several views, and in which—

Figure 1 is a plan view of a beet digging machine constructed in accordance with the invention; Fig. 2, a side elevation of same; Fig. 3, a section on the line 3—3 of Fig. 1; Fig. 4, a section on the line 4—4 of Fig. 1; Fig. 5, a rear view of the machine; Fig. 6, a front view of the machine; Fig. 7, a section on the line 7—7 of Fig. 1, and Fig. 8, a section on the line 8—8 of Fig. 1.

Referring to the drawings the invention is shown as comprising a V-shaped frame A which includes side members 10 and 11 and a central member 12, the side members 10 and 11 diverging rearwardly. The members 10, 11 and 12 are connected adjacent their rear ends by an axle 13 upon the ends of which are rotatably mounted respectively traction wheels 14. Depending from the forward end of the frame A is a rotatable bracket 15 in which is journaled a traction wheel 16. Secured to the axle 13 and inclined forwardly is a U-shaped guide frame 17 which is disposed in embracing relation to the central member 12. This guide frame 17 is strengthened by braces 18 and 19 connecting same to the central member 12. Pivoted between the members 10 and 12 adjacent the forward ends of the latter is a beam 20 the rear end of which terminates in a curved standard 21 carrying a digging blade 22. The rear edge of the standard 21 is provided with a plurality of teeth 23 for a purpose that will presently appear. It will be noted that the beam 20 moves between one arm of the frame 17 and the member 12 and is thereby properly guided during such movement. Pivoted between the member 11 and the member 12 adjacent the forward ends thereof is a beam 24 the rear end of which terminates in a curved standard 25 in the form of a knife or cutter 26. This beam moves between one arm of the frame 17 and the member 12 and is thereby properly guided during such movement. The rear edge of the standard 25 is provided with a plurality of teeth 27 with which mesh the teeth 28 on the enlarged end 29 of a lever 30 which latter is pivotally mounted on the member 12 in position to be conveniently operated by the foot of the driver for the purpose of raising the rear end of the beam 24. Likewise there is pivotally mounted on the member 12 in a position to be conveniently operated by the foot of the driver a lever 31 having an enlarged head 32 provided with teeth 33 which mesh with the teeth 23 and whereby the beam 20 can be elevated at its rear end when desired. Pivoted to the inner side of the member 10 is an arm 34 the rear end of which is carried inwardly as at 35 and then downwardly as at 36. The free end of this downwardly extending portion 36 terminates in a fork 37 which serves to rake the beets contained in the soil loosened by the blade 22 and thereby bring said beets to the top of said soil where they may be easily and conveniently gathered. Mounted upon the rear ends of the members 10 and 11 respectively are arms 38 which support at their upper ends an operator's seat 39.

What is claimed is:—

1. In a beet digging machine the combination of a wheeled frame, a pair of beams pivoted to the frame for movement in parallel planes, a digging shovel carried by the free end of one of said beams, and a cutter carried by the free end of the other beam.

2. In a beet digging machine the combination of a wheeled frame, a pair of beams pivoted to the frame for movement in parallel planes, means for elevating the free end of each beam, a digging shovel carried by the free end of one beam, and a cutter carried by the free end of the other beam.

3. In a beet digging machine the combination of a wheeled frame, a pair of beams pivoted to the frame and having their rear ends terminating in curved standards, teeth on the rear edge of each standard, levers pivoted on the frame and provided with enlarged ends, teeth on said ends meshing on the teeth of said standards respectively, a digging shovel mounted on the standard of one beam, and a cutter mounted on the standard of the other beam.

In testimony whereof, I affix my signature, in the presence of two witnesses.

JOHN M. SHERER.

Witnesses:
GILES W. JONES,
J. AVERY ODAM.

Copies of this patent may be obtained for five cents each, by addressing the "Commissioner of Patents. Washington, D. C."